United States Patent
Bourke-Dunphy et al.

(10) Patent No.: US 7,058,942 B2
(45) Date of Patent: ***Jun. 6, 2006

(54) SYSTEM AND METHOD TO FACILITATE INSTALLATION OF COMPONENTS ACROSS ONE OR MORE COMPUTERS

(75) Inventors: Erin M. Bourke-Dunphy, Seattle, WA (US); Jeff A. Zimniewicz, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1 day.

This patent is subject to a terminal disclaimer.

(21) Appl. No.: 11/094,920

(22) Filed: Mar. 31, 2005

(65) Prior Publication Data

US 2005/0172285 A1  Aug. 4, 2005

Related U.S. Application Data

(63) Continuation of application No. 09/725,386, filed on Nov. 29, 2000, now Pat. No. 6,918,112.

(51) Int. Cl.
*G06F 9/445* (2006.01)
(52) U.S. Cl. ..................................... 717/177
(58) Field of Classification Search ......... 717/174–178
See application file for complete search history.

(56) References Cited

U.S. PATENT DOCUMENTS

| | | |
|---|---|---|
| 5,721,824 A | 2/1998 | Taylor |
| 5,758,154 A | 5/1998 | Qureshi |
| 5,761,380 A | 6/1998 | Lewis et al. |
| 5,870,611 A | 2/1999 | London Shrader et al. |
| 5,999,181 A | 12/1999 | Tezuka et al. |
| 6,119,122 A | 9/2000 | Bunnell |
| 6,158,001 A | 12/2000 | Lee et al. |
| 6,286,010 B1 | 9/2001 | Ramachandran et al. |
| 6,381,742 B1 | 4/2002 | Forbes et al. |
| 6,442,754 B1 | 8/2002 | Curtis |
| 6,473,771 B1 | 10/2002 | Zimniewicz et al. |
| 6,487,713 B1 | 11/2002 | Cohen et al. |
| 6,556,223 B1 | 4/2003 | Tran et al. |
| 6,560,776 B1 | 5/2003 | Breggin et al. |
| 6,725,452 B1 | 4/2004 | Te'eni et al. |

OTHER PUBLICATIONS

S. Bennett et al., "Safe Mechanism for Installing Operating System Updates with Applications", IBM Technical Disclosure Bulletin, vol. 41, No. 01, Jan. 1998, pp. 557-560.*

Robert Ott, et al., "Connecting EIB Components to Distributted Java Applications", IEEE, 1999, p. 23-26.

M. Brune, et al., "Specifying Resources and Services in Metacomputing Systems", High Performance Cluster Computing: Architecture and Systems, 1999, p. 186-200, vol. 1.

P. Loshin, "Netscape's Enterprising Server Upgrade", BYTE (International Edition), May 1997, p. 123, vol. 22, No. 5.

(Continued)

*Primary Examiner*—Kakali Chaki
*Assistant Examiner*—Trenton J. Roche
(74) *Attorney, Agent, or Firm*—Amin & Turocy, LLP

(57) ABSTRACT

An interface is provided for identifying which components a user desires to install on one or more computers. An installation procedure is determined based on dependency requirements for components that are selected for installation. The installation procedure may describe a desired order and/or sequence for installing selected application and/or service components.

18 Claims, 8 Drawing Sheets

OTHER PUBLICATIONS

A. Harrington, "State of the Art [Windows 2000]", CA Magazine, May 2000, p. 44-45.

F. Hapgood, "Windows of Oppurtunity [Web Site Tools]", Inc. Tech., Dec. 1999, p. 114, 116, 118, 121, 122, 124, 126, 128, vol. 12, No. 4.

K. Kozel, "Corel's Click & Create: It's All in the Game", Emedia Professional, Jan. 1997, p. 92-96, vol. 10, No. 1.

S. Tezuka, et al., "PC-LAN Construction Support Tool: Easy Installer", Transactions of the Information Processing Society of Japan, Feb. 1996, p. 300-311, vol. 37, No. 2.

K. Fertitta, et al., "The State of Interchangeability in ATE", IEEE, 2000, p. 417-424.

H. Nakanishi, et al., "Object-Oriented Data Handling and OODB Operation of LHD Mass Data Acquisition System", Fusion Engineering and Design, 2000, p. 135-142.

S. Demetriadis, et al, "Graphical Jogthrough: expert based methodology for user interface evaluation, applied in the case of an educational simulation interface", Computer & Education, May 1999, p. 285-299, vol. 32, No. 4.

* cited by examiner

SYSTEM AND METHOD TO FACILITATE INSTALLATION OF COMPONENTS ACROSS ONE OR MORE COMPUTERS

CROSS-REFERENCE TO RELATED APPLICATIONS

This is a continuation application of U.S. patent application Ser. No. 09/725,386, filed Nov. 29, 2000 now U.S. Pat. No. 6,918,112, and entitled, "SYSTEM AND METHOD TO FACILITATE INSTALLATION OF COMPONENTS ACROSS ONE OR MORE COMPUTERS." The entirety of this application is incorporated herein by reference.

TECHNICAL FIELD

The present invention relates to computer programming and, more particularly, to a system and method to facilitate installation of components.

BACKGROUND

Software applications and/or services are commonly offered to consumers in the form of grouped packages or suites, in which two or more such applications are provided. A suite is generally provided at a lower cost than if the individual applications included therein were purchased separately. In addition, a software suite typically includes an assortment of related and/or interoperable applications or services targeted to satisfy the software needs of a particular type of customer, such as small businesses or other types of organizations. Different application suites may thus be provided to satisfy various market needs, where certain segments of software consumers commonly require more than one application or service.

It is common to install the various applications of a suite onto one or more interconnected computers. However, if the applications are not installed in a proper sequence and with a proper dependency for the installed components, there is an increased likelihood of errors occurring during installation. When an error occurs, the user typically must exit the current installation, correct the error identified, and reinitiate the installation procedure. This dilemma increases in situations where the installation includes multiple machines.

An organization may include several servers physically located at different locations, e.g., one server at a corporate central office, with additional servers located at remote locations. The particular application and/or services that are installed at the different machines in the organization may vary as a function of the type of organization and the performance objectives of the administrator that implements the installation. By way of example, assume that a large suite of applications is to be installed across several machines in the organization. If interdependent applications are not properly installed, an administrator may be required to exit the installation resolve each interdependency issue that arises during installation prior to continuing with the installation, thereby adding undesirable time to the installation process.

Therefore, it is desirable to provide a system and method to generate an installation procedure that may be followed to mitigate installation errors and to facilitate the installation of selected components.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and method for planning an installation procedure for a plurality of application and/or service components. An interface is provided for identifying which components a user desires to install. The identified components may be selected for installation on one or more computers. An installation procedure is determined based on dependency requirements for the components that are selected for installation. The installation procedure may describe an order and/or sequence for installing selected application and/or service components.

Data also may be generated corresponding to the installation procedure, which data may be utilized to automate installation of the selected components. For example, the installation procedure may be employed to populate a data structure that characterizes a relationship of at least some of the selected components, such as identifying the components and where such components are to be installed. The data structure may be stored at a globally accessible location or, if the globally accessible location is unavailable, it may be stored to a file. The data structure may be accessed during installation of the components to control one or more aspects of the installation.

As a result, installation of the application components may be facilitated, with the prescribed installation procedure that, if followed, mitigates errors that otherwise might occur during installation of selected components.

One particular aspect of the present invention provides a system for planning installation of available application or service components. The system includes an interface component for entering desired system configuration information, the interface component providing an installation procedure based on dependency requirements for the available components.

Another aspect of the present invention provides a method for planning installation of a plurality of application or service components. The method includes selecting components to be installed and determining an installation procedure based on dependency requirements for the selected components. In accordance with one particular aspect of the present invention, the method may be implemented as computer-executable instructions in a computer-readable medium.

Yet another aspect of the invention relates to a data packet adapted to be transmitted between at least two processes. The data packet includes an interface component for entering desired system configuration information, the interface component providing an installation procedure based on dependency requirements for a plurality of application or service components.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DESCRIPTION OF THE INVENTION

The present invention provides a system and method to facilitate installation of a plurality of application and/or service components across one or more computers. An installation procedure is provided as a function of components selected for installation. The installation procedure further may identify other components for installation that are necessary to ensure proper dependency for the selected components.

Figure 1:
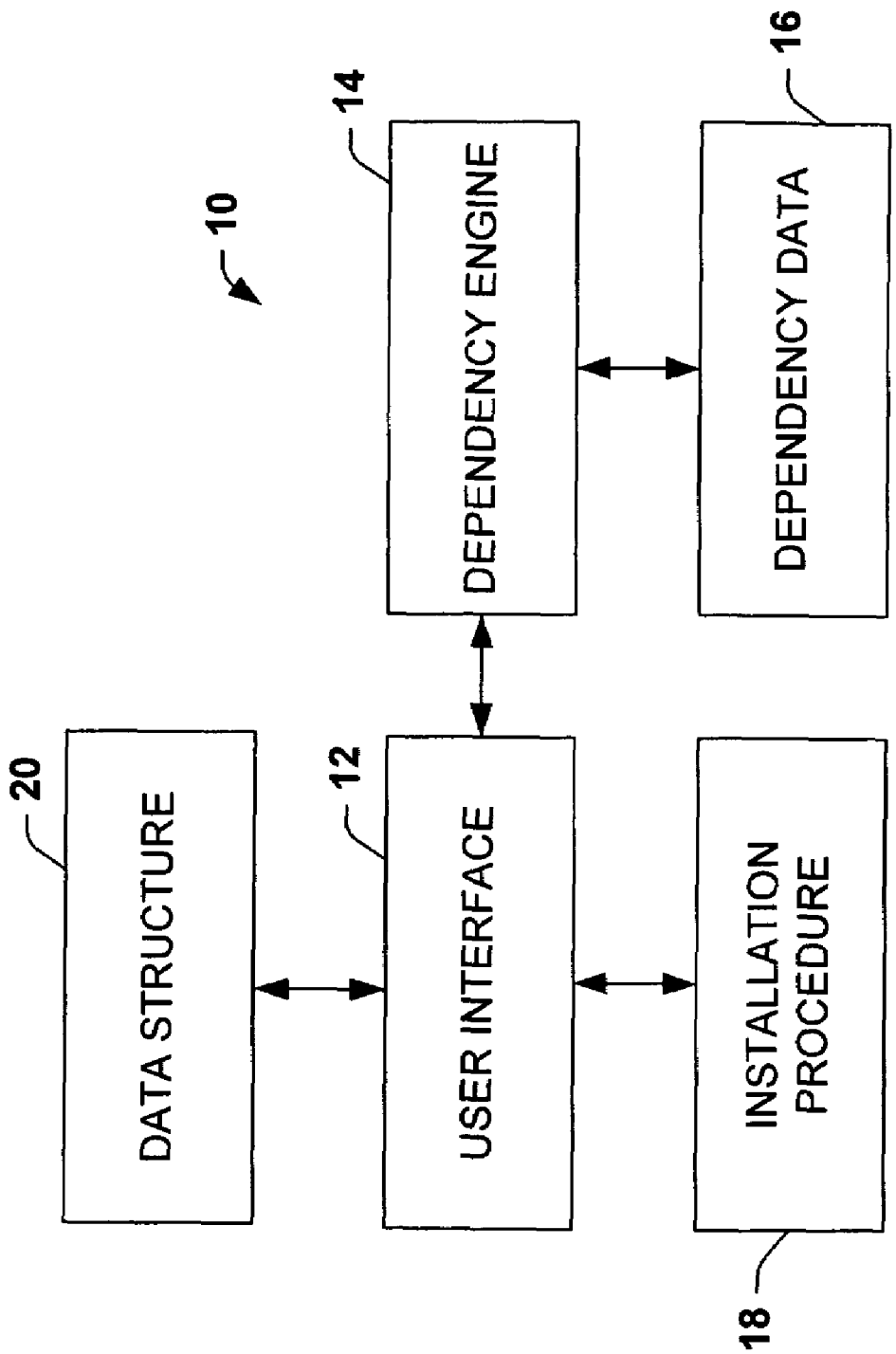
FIG. 1 is a functional block diagram illustrating a system for determining an installation procedure in accordance with the present invention.

FIG. 1 illustrates a system 10, in accordance with an aspect of the present invention, which may be utilized to facilitate installation of application and/or service components. The system 10 includes a user interface component 12 that displays instructions and receives selections from a user relating to installation of a plurality of components. For example, the user interface 12 may prompt the user to select which components the user desires to install. The user interface also may query the user as to on which computer or computers each selected component is to be installed.

The user interface 12 is operatively associated with a dependency engine 14 for determining whether the component selections violate any dependency rules. The dependency engine 14 may access dependency data 16 that defines the interdependencies for the set of components associated with the given installation. By way of example, the dependency data 16 may be organized in the form of hierarchal tree structure, in which each component requires concurrent installation of all higher-level components that connect that component to the base level of the tree. Alternatively, dependency rules could be built into the dependency engine 14 or implemented as a look-up table. Those skilled in the art will understand and appreciate other implementations that may be utilized to ensure proper component dependency in accordance with an aspect of the present invention.

If one or more component selections fail to meet the required (or desired) interdependencies, the dependency engine 14 returns information indicative of such failure. The information also may identify which selected components are affected and what action is required to meet the dependency requirements. For example, the user interface 12 may display a graphical (or textual) indication of a proper dependency for each of the selected components. For example, the dependency engine 14 may add other components to the user-selected components, such that the user interface 12 displays a composite list of components to the user. The user interface 12 further may present the user with an option to accept the composite list of displayed components, which conform to predefined dependency rules for the selected components.

If the user accepts the displayed component list, the user interface 12 generates an installation procedure 18. The installation procedure 18 identifies a desired installation order for selected components that are to be installed, which also may identify the computer(s) on which the components are to be installed. The installation procedure 18 may be displayed on screen and/or may be printed to an associated peripheral device.

The user interface 12 also may generate a data structure 20 based on the installation procedure 18. The data structure 20 stores information about which components are to be installed and where (e.g., which computer) such components are to be installed. The user interface may store the data structure information as a file. Prior to actual installation of the selected components, a user or an application associated with the installation/setup may transfer the file to the directory service. By way of example, the user interface 12 may write the file to a directory service (e.g., a distributed directory) of a network domain. After writing the file to the directory service, the file may be deleted from memory.

Examples of directory services include the "Active Directory™" directory service provided by the Microsoft Corporation of Redmond, Wash. and the "Novell Directory Services™", which is based on the X.multidot.500 network services protocol developed and published by the Open Systems Interconnection Consortium. Information on a distributed directory may be created, read, modified, and shared by other nodes in a network infrastructure, such as client nodes or other server nodes, which have applicable access rights to the distributed directory.

The data structure 20 thus provides useful information that may be utilized during installation to automate at least part of the installation process. For example, decisions relating to which components to install and where such components are to be installed may be automatically set by default to correspond to the information stored in the data structure 20. Alternatively, a user may modify the installation parameters during installation, in which case the remaining parts of data structure may be ignored or deleted.

Figure 2:
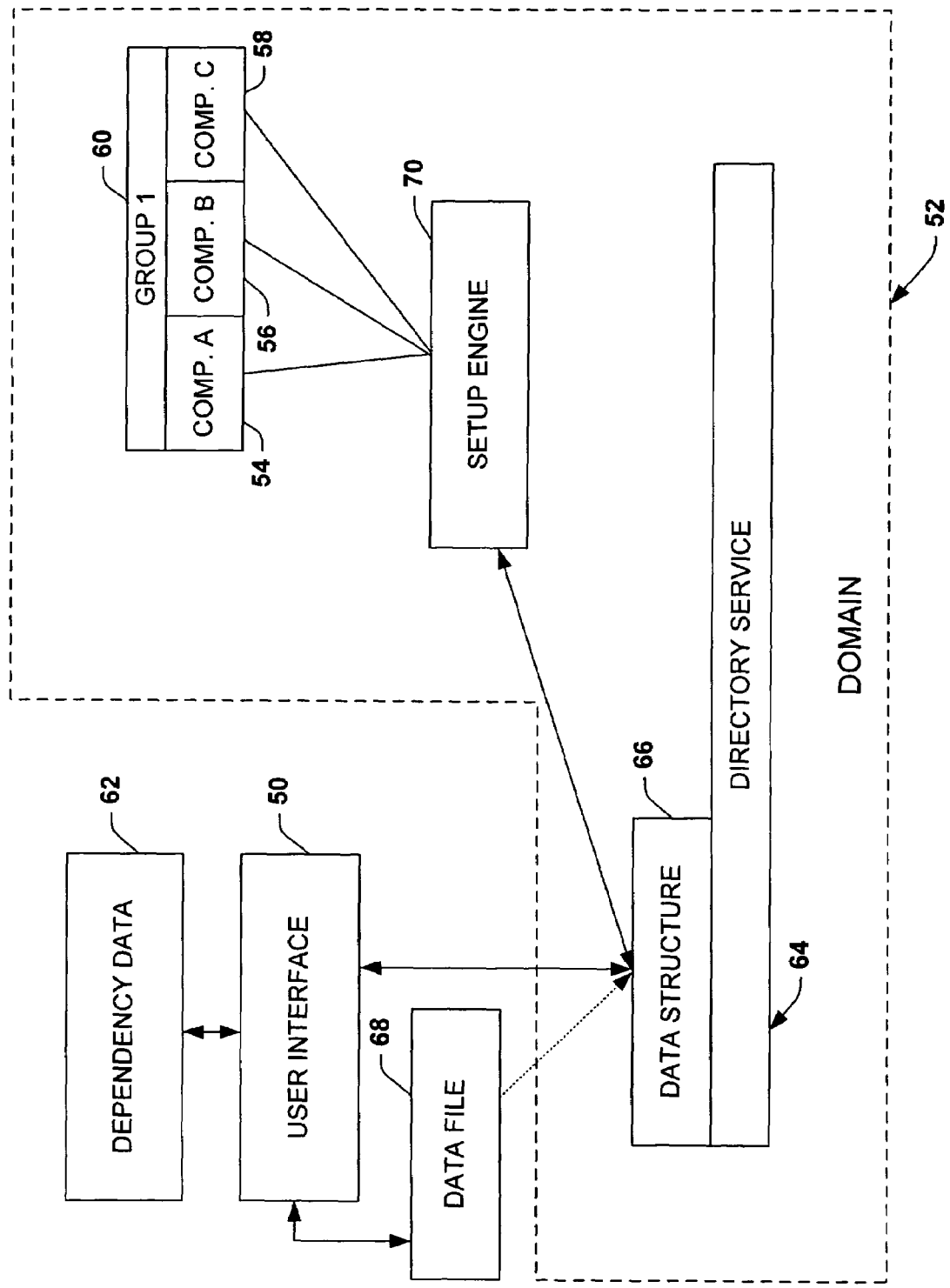
FIG. 2 is an example of domain employing a system, in accordance with the present invention, to facilitate installation of components in the domain.

FIG. 2 illustrates a user interface 50 which may be utilized, in accordance with an aspect of the present invention, to provide an installation procedure for installing a plurality of components to one or more computers in a network domain 52. In this example, the network domain 52 includes a plurality of computers 54, 56, and 58, which may be arranged into a virtual group of computers 60. It is to be appreciated that the network domain 52 may have more than one virtual group and/or that each such group may include one or more computers.

In accordance with an aspect of the present invention, the user interface 50 determines an installation procedure in response to components selected for installation by a user. In particular, the component selections and associated computers are correlated relative to dependency data 62 to determine whether any dependency mismatches exist. The user interface 50 may add additional components to the selected components in accordance with the dependency requirements defined by the dependency data 62.

The resulting list of components may be employed to generate a file 68 for storing the data structure information.

The file 68 may be transferred to a data structure 66 of the directory service 64 automatically, such as when the computer on which the user interface 50 is running is part of the network domain 52. However, if a container for the data structure 66 does not already exist in the directory service 64, appropriate executable code may be employed to extend the directory service to include a container for storing the data structure. Alternatively, the file may be stored in memory and subsequently transferred to the directory service 64 as part of a separate process, such as associated with installation of the components. The file and the resulting data structure 66 characterize the contents of a corresponding virtual group of computers (e.g., the virtual group 60), such that other applications and processes may treat the computers and the associated components as a virtual being part of a single virtual group. Advantageously, the installation procedure may be generated using almost any computer, which may or may not be part of the network domain 52.

As mentioned above, the data structure 66 generated via the user interface 50 may be utilized to automate part of the installation of components onto computers 54, 56, 58 within the domain 52. By way of illustration, a setup engine 70 may access the data structure 66 from the directory service 64 to drive installation and/or setup of associated software. The setup engine 70, in turn, identifies to the user which component or components have been selected to be installed on a given computer 54, 56, 58 based on the installation information stored in the data structure 66. A user may accept the installation parameters derived from the data structure 66 or modify component selections during installation, such as may be presented via an appropriate user interface. The setup engine 70 also may notify a user about potential problems or conflicts that may exist during installation or setup.

While the setup engine 70 is illustrated as being external to the computers 54, 56, and 58, it is to be appreciated that the setup engine also could be resident on one or more of the computers during installation/setup. It is also to be understood and appreciated that the installation onto the computers 54, 56, and 58 may be conducted from one computer in the network domain 52, with components being selectively installed to each computer remotely via the communications infrastructure that interconnects such computers.

Figure 3:
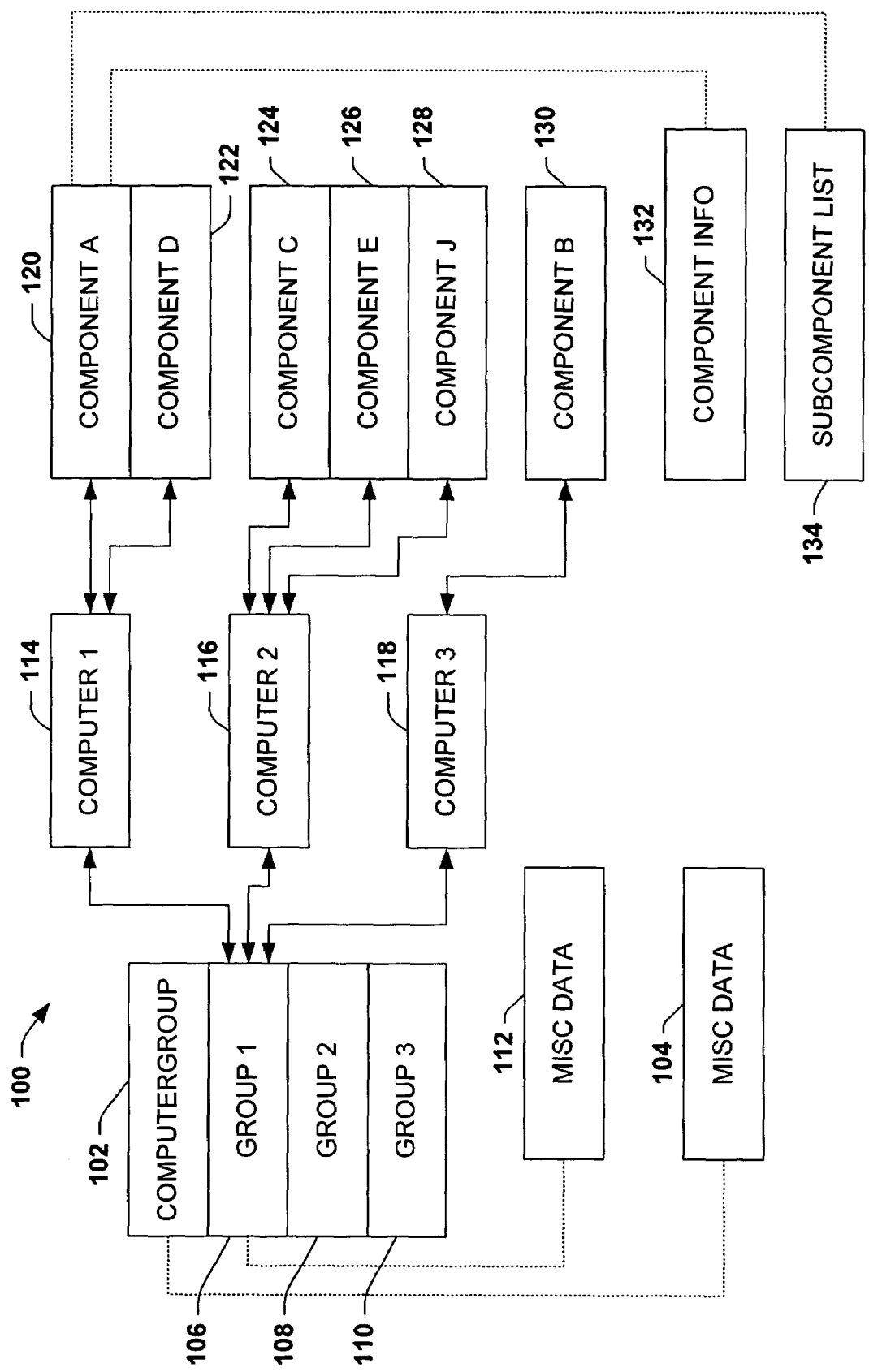
FIG. 3 is an example of a data structure that may be produced by a system in accordance with the present invention.

FIG. 3 illustrates an example of a data structure 100, in accordance with an aspect of the present invention, such as may be stored in a directory service. As mentioned above, the data structure 100 contains information indicative of installation parameters, identifying selected components to be installed on each computer. The user interface may employ appropriate executable code to import the data structure 100 to an appropriate directory service. The executable code typically is utilized once during the initial deployment to create the data structure. Other executable also may be employed to modify or update the data structure 100, such as if the user interface is run again to plan another installation. Suitable graphical user interface components, such as dialog boxes, may be associated with the executable instructions to indicate confirmation and/or progress for creation of and updates to the data structure 100.

Referring back to the example of FIG. 3, the data structure 100 includes an object 102 called COMPUTERGROUP of a corresponding class type (e.g., of type computerGroup-Manager). The COMPUTERGROUP object 102 may be utilized, such as by a setup engine or other applications, to access the individual group objects that form the data structure 100. The COMPUTERGROUP object 102 further may have one or more properties, such as may include a MISCDATA property 104. The MISCDATA property 104, for example, is a multi-valued string property that may be used to store selected information in connection with the COMPUTERGROUP object 102. By way of example, the MISCDATA property 104 maps a Global Unique Identifier (GUID) to each item of string data provided.

The COMPUTERGROUP object 102 includes one or more children group objects 106, 108, and 110, such as may be named "[Group Name] COMPUTERGROUP" of type computerGroup. By way of example, the "Group Name" may identify a first computer (e.g., a server) within a group of computers. Each group object (e.g., the Group1 object 106), which identifies a corresponding group of computers, also may include a MISCDATA property 112 for storing selected information in connection with the group object, such as by mapping a Global Unique Identifier (GUID) to each item of string data provided.

Under each group object (e.g., the GROUP1 object 106), are one or more computer objects named COMPUTER1 114, COMPUTER2 116, and COMPUTER3 118 of type computerGroupComputer for identifying each computer (e.g., server) in the group. For example, each computer object may be identified by the computer's respective name in a network domain. For purpose of brevity, only the computers associated with GROUP1 are illustrated in FIG. 3. It is to be appreciated that the other group objects 108, 110 may be similarly configured, in accordance with an aspect of the present invention.

Information indicative of the application and/or service components (e.g., the top level components), which have been selected for installation via an associated user interface. The information is organized as component objects 120, 122, 124, 126, 128, and 130 under the respective computer objects 114, 116, 118 onto which they are selected to be installed. The component objects 120–130, for example, are indicated by name and are of type serverComponent. By way of illustration, components 120 and 122 have been selected to be installed on the COMPUTER1 114, components 124, 126, and 128 have been selected to be installed on COMPUTER2 116, and component 130 has been selected to be installed on COMPUTER3 118.

Each of the components 120–130 further may include two properties, namely, COMPONENT INFO 132 and SUB-COMPONENT LIST 134. The COMPONENT INFO 132 property may be used to store information about the high level components, which have been selected for installation by the user. The SUBCOMPONENT LIST 134 property is a multi-valued property for identifying the subcomponents of each component.

The system utilizes a COMPUTER GROUP container to store its information in a directory service. By way of illustration, if the directory structure is as follows:
LDAP://dc=foo,dc=ms,dc=com
  CN=COMPUTER GROUP
    CN=JZTestSvr1 COMPUTER GROUP, then the MISCDATA property of the JZTestSvr1 COMPUTER GROUP object will contain the planning data associated with installing the components at the JZTestSRV1 computer.

By way of further illustration, five GUIDs may be used to track the planning data. They are:
AE082E3#-42C4-492c-9BB4-825493240E91
  with # 0, 1, 2, 5, and 6 as follows
0=a list of the components on computer 1 (referenced by GUIDS)

1=a list of the components on computer 2 (referenced by GUIDS)
2=a list of the components on computer 3 (referenced by GUIDS)
5=is the order of the computer that the system recommends
6=the current system in the order of '5', referenced by the GUID (0, 1,2).

The data structure may be stored in its final format in which each component is stored under its appropriate group object identified by a corresponding GUID and associated module ID. It is to be appreciated that, for organizational reasons, the Step may just contain the top-level components to install. Each top-level component may, in turn, be used as a MISCDATA key that is employed to obtain the subcomponents for each respective top-level component that is to be installed.

An example of the group object data structure for GROUP1 of FIG. 3, assuming a domain of foo.ms.com, is as follows:

```
LDAP://dc=foo,dc=ms,dc=com
    CN=COMPUTERGROUPS
        CN=GROUP1 COMPUTERGROUP
            CN=COMPUTER1
                CN=COMPONENTA
                CN=COMPONENTD
            CN=COMPUTER2
                CN=COMPONENTC
                CN=COMPONENTE
                CN=COMPONENTJ
            CN=COMPUTER3
                CN=COMPONENTB
```

It is to be appreciated that, in accordance with an aspect of the present invention, any number of groups may be implemented within a given domain. In addition, any number of components may be installed onto each computer within the virtual group of computers.

Figure 4:
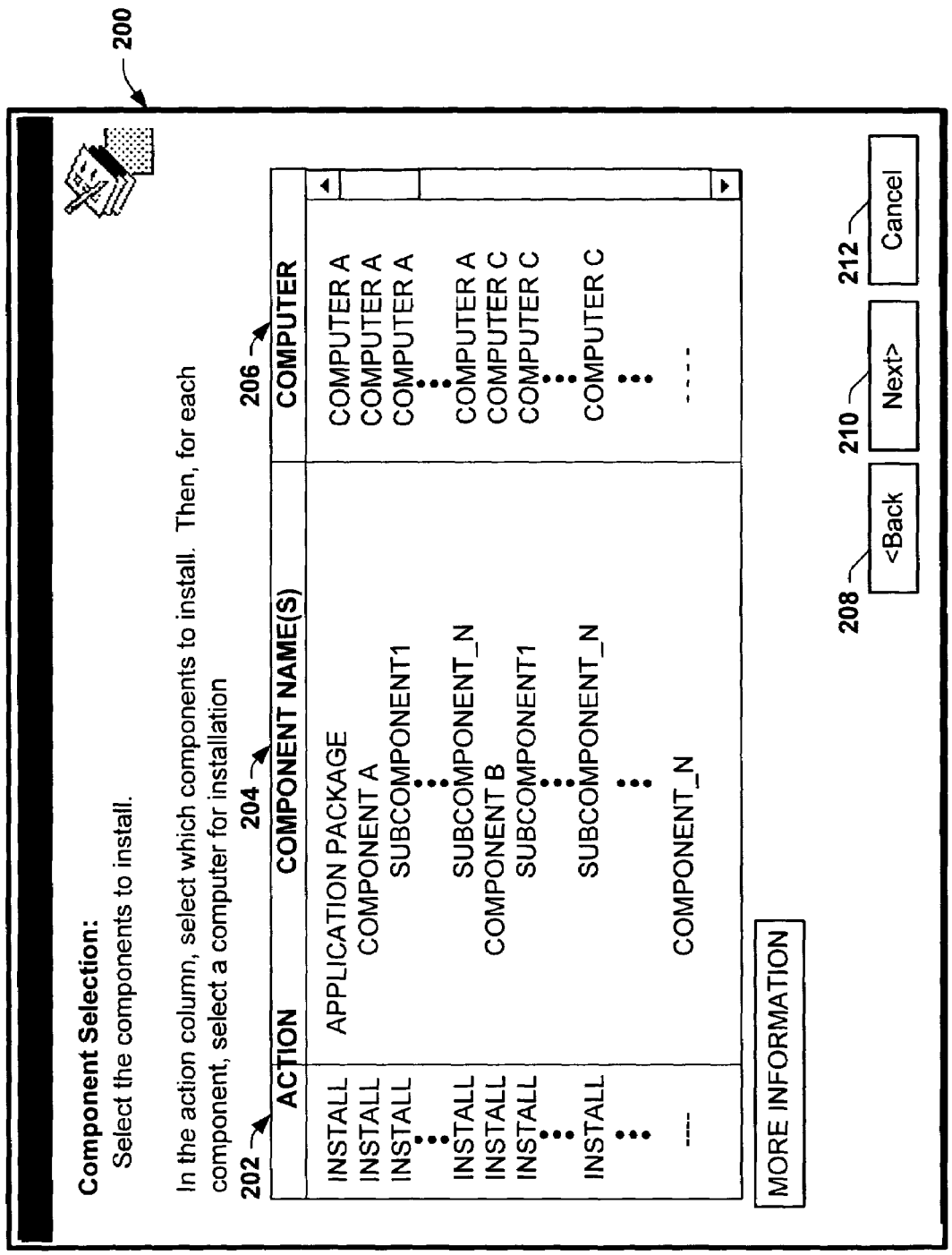
FIG. 4 is an example of a component selection user interface in accordance with the present invention.

FIG. 4 illustrates an example of a component selection user interface 200 for selecting components to be installed onto one or more computers in accordance with an aspect of the present invention. The component selection user interface 200, for example, may be implemented as part of a pre-installation procedure, in accordance with an aspect of the present invention. By planning the installation of components prior to initiating the actual installation, the likelihood of errors occurring during subsequent installation is mitigated. By way of example, the components and subcomponents may correspond to suite of software applications, such as server applications or Web-based services, which are to be installed onto one or more computers (e.g., servers). If a proper dependency is not maintained between components during installation, errors tend to occur resulting in undesirable, added installation steps.

The component selection interface 200 includes a user interface element 202, for selecting a desired action to perform with respect to each available component. In particular, each interface element 202 maps to an associated component user interface element 204 for indicating what action is to be performed with respect to an associated component (e.g., whether or not the component is selected to be installed). The user interface element 204 also may include drop down menu for displaying subcomponents of the respective components. In this way, a hierarchy of the available components and subcomponents may be shown to the user, from which a user may selectively install each component. Typically, subcomponents of top-level components are selected for installation upon selecting its parent component for installation. Each component user interface element 204 is associated with a computer location user interface element 206, which identifies the computer (e.g., by name) where a user has selected each respective component to be installed.

The component selection interface 200 may include action buttons, such as a BACK action button 208, a NEXT action button 210, and a CANCEL button 212 for navigating through available menus associated with the planning system. For example, by selecting the NEXT button 210, the user interface employs a dependency engine to process the selection criteria and determine whether the selected components conform to predetermined dependency rules (or requirements). Another user interface may be provided to display desired dependencies for the selected components.

Figure 5:
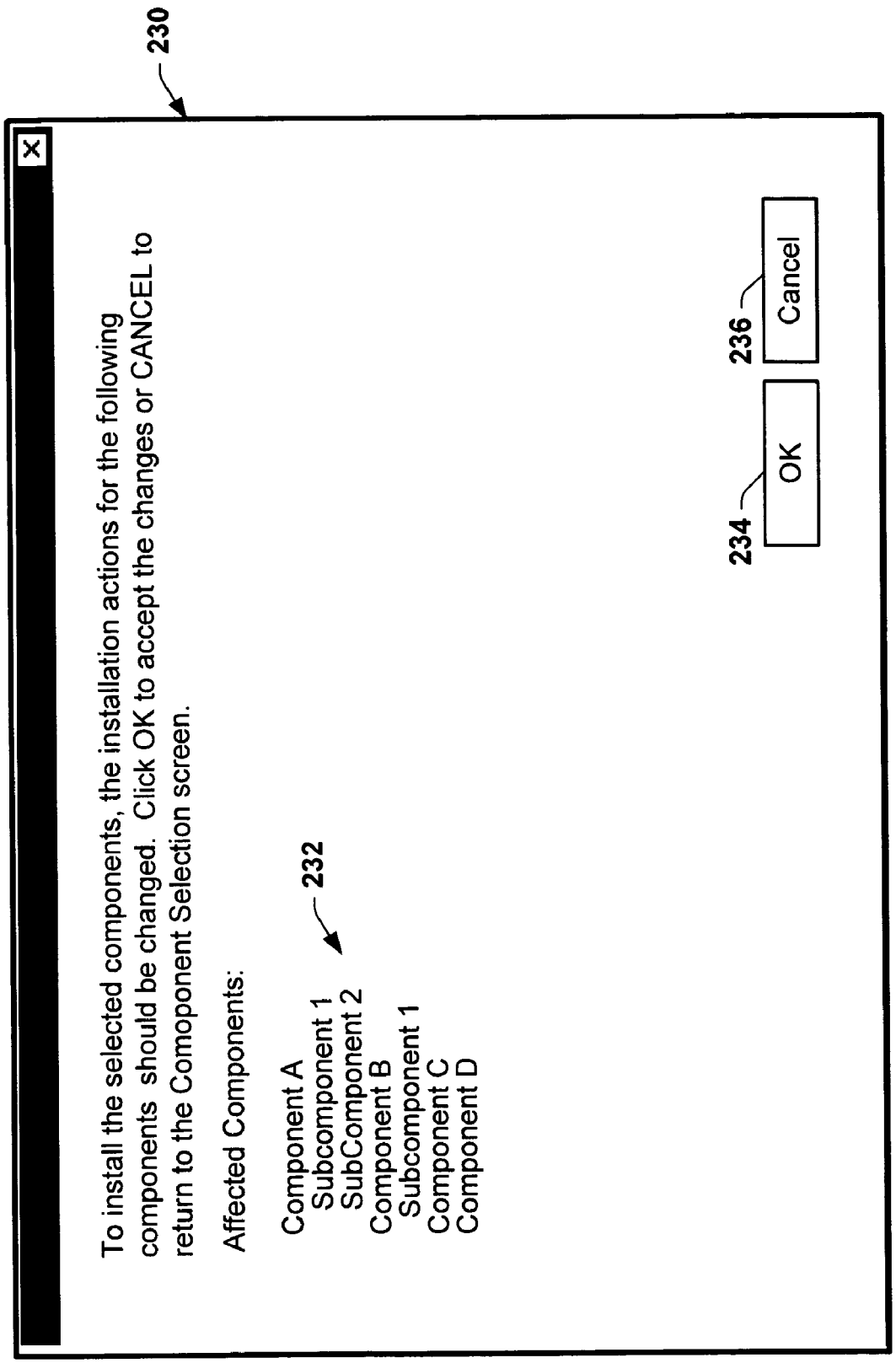
FIG. 5 is an example of a user interface for identifying component dependency in accordance with the present invention.

FIG. 5 illustrates an example of a user interface 230 for displaying a list 232 showing component dependencies for the selected components and any components that may have been added to conform to dependency requirements. The user interface 230 also may be employed to identify potential problems associated with the component selection information, such as if the selected components violate one or more dependency rules.

By way of example, a dependency engine generates the user interface 230 based on installation information (e.g., selected components and computers) selected in connection with the user interface 200 of FIG. 4. If a particular component is selected for installation in the absence of selecting a necessary associated component or subcomponent, the dependency engine may add the necessary component(s). The selected components and the added components are collectively displayed as the list 232 of the user interface 230. When the selected components do not have a proper dependency, the interface 230 further may identify the affected components and subcomponents. The list 232 thus provides a user with a composite representation of all the components that need to be installed based on the components selected for installation.

The user may accept or reject the list 232. For example, the user interface 230 may include an OK action button 234, which the user may select to automatically accept the displayed component selection information 232. Alternatively, the user may select a CANCEL action button 236 to return to the component selection user interface (e.g., see FIG. 4), where the user may manually modify the component selections.

Figure 6:
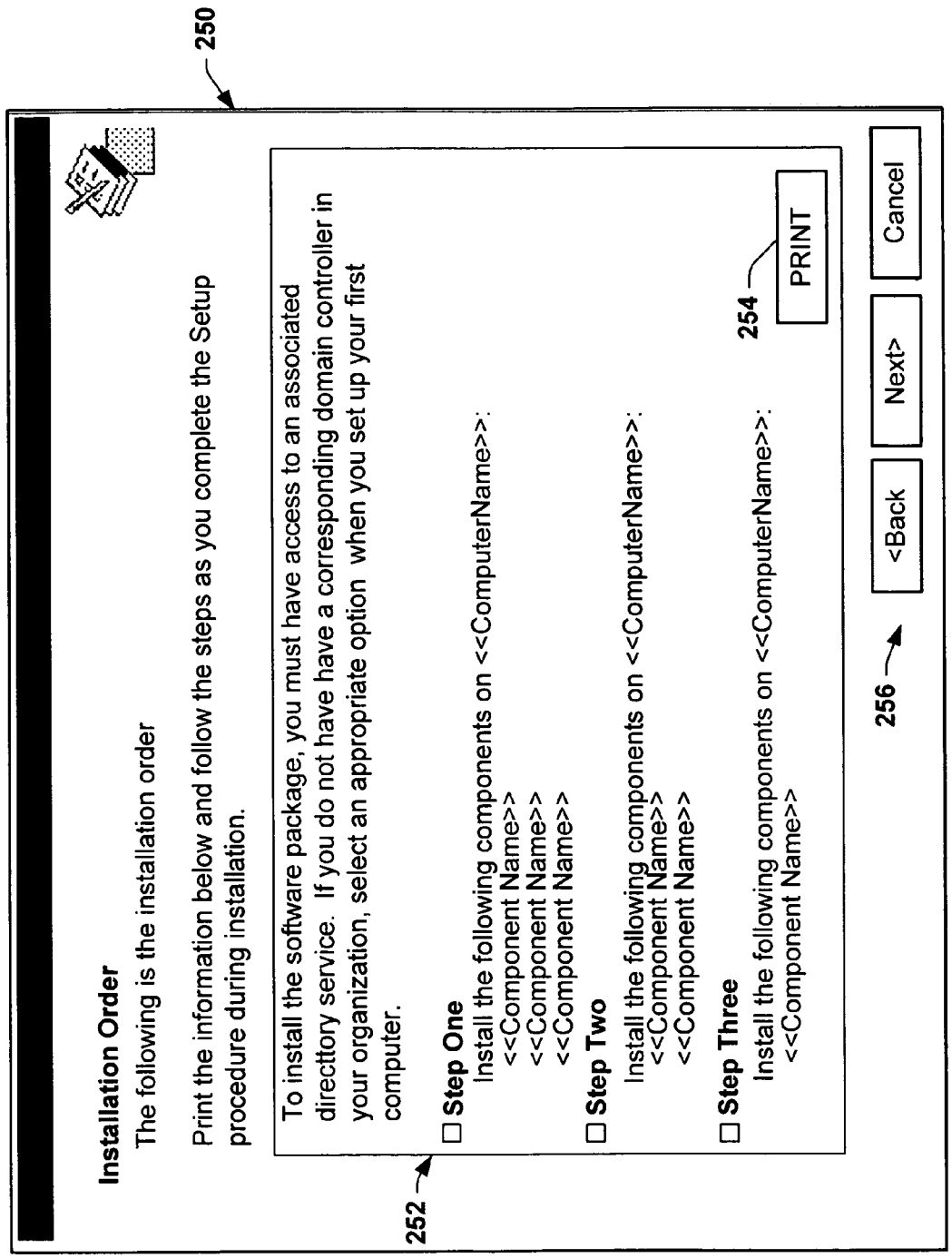
FIG. 6 is an example of an installation procedure user interface in accordance with the present invention

Upon accepting the displayed component dependency list 232 for the software being installed, the system may generate an installation order user interface 250, such as shown in FIG. 6. The installation order user interface 250 displays a step-by-step installation procedure 252, identifying the order and sequence in which each component should be installed. The user interface 250 further includes a PRINT action button 254 that the user may select to print a hard copy of the installation procedure 252. A user may employ the printed copy to identify which components and the sequence that such components are to be installed on each computer. The printed copy of the installation procedure thus provides a tangible guide that the user may present at each computer where the components are being installed. The user interface 250 further includes other action buttons, generally indicated at 256, which may be utilized to navigate through the various menus and user interface screens associated with the planning system.

In conjunction with generating the installation procedure, a file representing a data structure (see, e.g., FIG. 3) may be generated for characterizing the interrelationship between the selected components and the computer(s) on which they are to be installed. The file may be stored in memory. If an appropriate directory service is available, the file may be imported to the directory service, after which the file may be deleted. If the directory service is not available, the file may be stored in memory and, in turn, subsequently be imported during setup and/or installation of the software to which the installation procedure applies.

In view of the foregoing, it has been shown that the present invention facilitates installation of components onto one or more computers. In accordance with one particular aspect of the present invention, a planning system may be employed to facilitate installation of application of components onto one or more servers. It is to be understood and appreciated by those skilled in the art that the present invention is equally applicable to facilitate integration, installation, and/or management of other types of components, such as for non-server components and/or components for web-based services.

Moreover, the data structure created, in accordance with an aspect of the present invention, may be utilized by other applications to facilitate their installation. For example, it may be desirable to access the group object during installation of other applications and/or services to determine on which computer (or which virtual group) certain components are installed. In this way, such other applications and/or services may target installation to one or more computers to capitalize on the resources installed on such computers.

Figure 7:
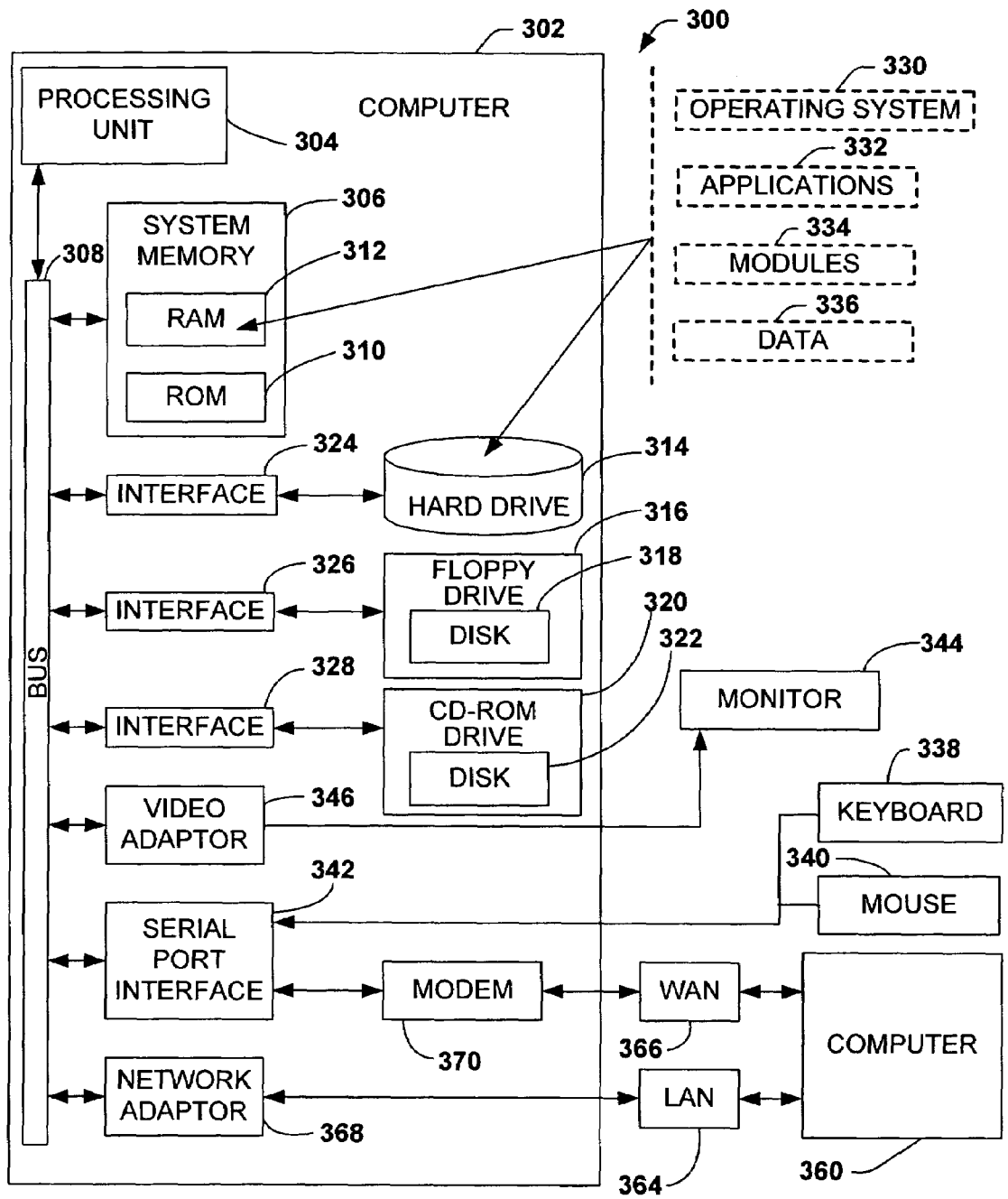
FIG. 7 is an example of a operating environment in which the present invention may be implemented.

In order to provide additional context for the various aspects of the present invention, FIG. 7 and the following discussion are intended to provide a brief, general description of a suitable computing environment 300 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. However, some, if not all, aspects of the invention may be practiced on stand-alone computers, with the present invention facilitating expansion and growth to multiple computers. In a distributed computing environment, program modules may be located in both local and remote memory storage devices.

With reference to FIG. 7, an exemplary system environment 300 for implementing the various aspects of the invention includes a computer 302, such as a server. The computer 302 includes a processing unit 304, a system memory 306, and a system bus 308 that couples various system components including the system memory to the processing unit 304. The processing unit 304 may be any of various commercially available processors, including but not limited to Intel x86, PENTIUM and compatible microprocessors from Intel and others, including Cyrix, AMD and Nexgen; ALPHA microprocessors from Digital; MIPS microprocessors from MIPS Technology, NEC, IDT, Siemens, and others; and the POWERPC microprocessors from IBM and Motorola. Dual microprocessors and other multi-processor architectures also may be used as the processing unit 304.

The system bus 308 may be any of several types of bus structure including a memory bus or memory controller, a peripheral bus, and a local bus using any of a variety of conventional bus architectures such as PCI, VESA, Microchannel, ISA, and EISA, to name a few. The system memory includes read only memory (ROM) 310 and random access memory (RAM) 312. A basic input/output system (BIOS), containing the basic routines that help to transfer information between elements within the computer 302, such as during start-up, is stored in ROM 310.

The computer 302 also may include, for example, a hard disk drive 314, a magnetic disk drive 316, e.g., to read from or write to a removable disk 318, and an optical disk drive 320, e.g., for reading from or writing to a CD-ROM disk 322 or other optical media. The hard disk drive 314, magnetic disk drive 316, and optical disk drive 320 are connected to the system bus 308 by a hard disk drive interface 324, a magnetic disk drive interface 326, and an optical drive interface 328, respectively. The drives and their associated computer-readable media provide nonvolatile storage of data, data structures, computer-executable instructions, etc. for the computer 302. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment 300, and further that any such media may contain computer-executable instructions for performing the methods of the present invention.

A number of program modules may be stored in the drives and RAM 312, including an operating system 330, one or more application programs 332, other program modules 334, and program data 336. The operating system 330 in the illustrated computer is, for example, one of the MICROSOFT WINDOWS® operating systems, which are available from Microsoft Corporation. It is to be appreciated, however, that the present invention may be implemented with other operating systems or combinations of operating systems.

A user may enter commands and information into the computer 302 through one or more user input devices, such as a keyboard 338 and a pointing device (e.g., a mouse 340). Other input devices (not shown) may include a microphone, a joystick, a game pad, a satellite dish, a scanner, or the like. These and other input devices may be connected to the processing unit 304 through a serial port interface 342 that is coupled to the system bus 308, although such devices may be connected by other interfaces, such as a parallel port, a game port, a universal serial bus (USB), etc. A monitor 344 or other type of display device is also connected to the system bus 308 via an interface, such as a video adapter 346. In addition to the monitor 344, the computer 302 may include other peripheral output devices (not shown), such as speakers, printers, etc.

As mentioned above, the computer 302 may operate in a networked environment using logical connections to one or more other computers 360, such as may form part of a common network domain. The remote computer 360 may be a workstation, a server computer, a router, a peer device or other common network node, and typically includes many or all of the elements described relative to the computer 302. The logical connections depicted in FIG. 7 may include a local area network (LAN) 364 and a wide area network (WAN) 366. Such networking environments are commonplace in offices, enterprise-wide computer networks, intranets and the Internet.

When used in a LAN networking environment, the computer 302 is connected to the local network 364 through a network interface or adapter 368. When used in a WAN networking environment, the computer 302 typically includes a modem 370, or is connected to a communications server on the LAN, or has other means for establishing communications over the WAN 366, such as the Internet. The modem 370, which may be internal or external, is connected to the system bus 308 via the serial port interface 342 (e.g., for communications over POTS). The modem alternatively may be connected to the system bus 308 via the network interface or adapter 368 (e.g., for communication over DSL, cable, satellite, etc.). In a networked environment, program modules depicted relative to the computer 302, or portions thereof, may be stored in the remote memory storage device. It will be appreciated that the network connections shown are exemplary and other means of establishing a communications link between the computers 302 and 360 may be used.

In accordance with the practices of persons skilled in the art of computer programming, the present invention has been described with reference to acts and symbolic representations of operations that are performed by a computer, such as the computer 302 or remote computer 360, unless otherwise indicated. Such acts and operations are sometimes referred to as being computer-executed. It will be appreciated that the acts and symbolically represented operations include the manipulation by the processing unit 304 of electrical signals representing data bits which causes a resulting transformation or reduction of the electrical signal representation, and the maintenance of data bits at memory locations in the memory system (including the system memory 306, hard drive 314, floppy disks 318, CD-ROM 322) to thereby reconfigure or otherwise alter the computer system's operation, as well as other processing of signals. The memory locations where such data bits are maintained are physical locations that have particular electrical, magnetic, or optical properties corresponding to the data bits.

Figure 8:
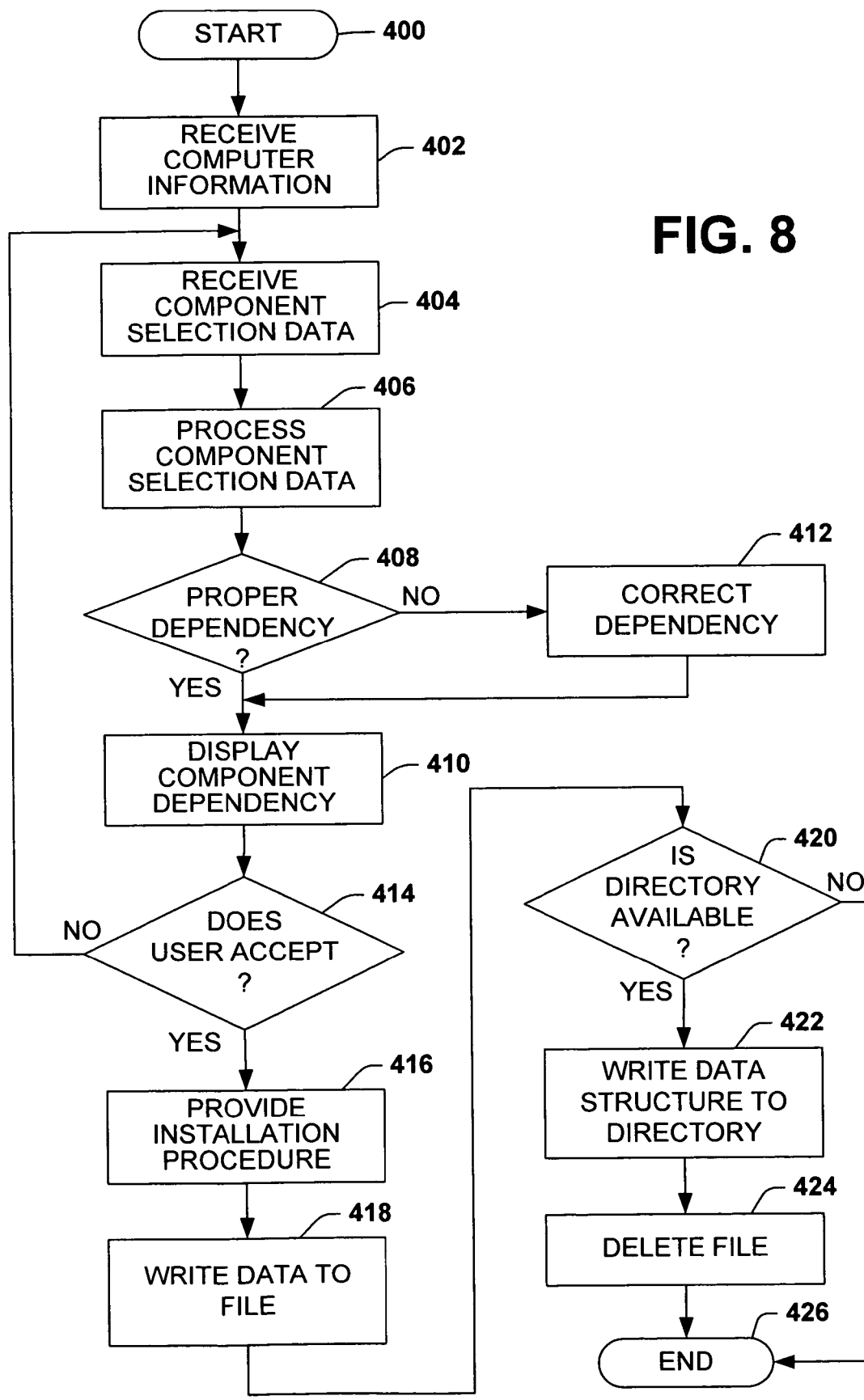
FIG. 8 is a flow diagram illustrating a methodology for determining an installation procedure in accordance with the present invention.

In view of the foregoing structural, functional, and graphical features described above, a methodology in accordance with an aspect of the present invention will be better appreciated with reference to FIG. 8. While, for purposes of simplicity of explanation, the methodology of FIG. 8 is shown and described as a series of steps, it is to be understood and appreciated that the present invention is not limited by the order of steps, as some steps may, in accordance with the present invention, occur in different orders and/or concurrently with other steps from that shown and described herein. Moreover, not all illustrated steps may be required to implement a methodology in accordance with an aspect the present invention.

Turning to FIG. 8, the methodology begins at step 400 in which an installation planning process or method in accordance with an aspect of the present invention, is activated. The process proceeds to step 402 in which information is received about the computer (or computers) to which the installation relates. The computer information, for example, is provided in response to a corresponding user interface prompting the user to identify the computer(s) where the software is to be installed. The information, for example, may include a name or other identifying characteristics of each computer. The identified computer(s) may be stand-alone machines or interconnected within a common network domain.

From step 402, the process proceeds to step 404 in which component selection data is received. The component selection data may be entered via a graphical user interface displaying available application and/or service components associated with the software to be installed. The user may employ the interface to select which component(s) are to be installed on which computer(s). After the component data has been received, the process proceeds to step 406.

At step 406, the component selection data is processed, such as to ensure proper interdependency between the selected components. Next, at step 408, a determination is made as to whether there is proper dependency between all the selected components. This determination, for example, may be made based on comparing the components of the selection data with stored dependency data, which characterizes necessary interrelationships between the various components in the software. The dependency data may be organized in the form of hierarchal tree structure, in which each component requires concurrent installation of all higher-level components that connect that component to the base level of the tree. Those skilled in the art will understand and appreciate alternative dependency schemes (e.g., lookup tables, rule-based algorithms, etc.) that may be implemented in accordance with the present invention.

If the selection data has proper dependency for all selected components, the process proceeds to step 410. At step 410, a component dependency is displayed to the user based on the selection data. If the determination at step 408 is negative, indicating improper dependency for at least some of the selected components, the process proceeds to step 412. At step 412, the improper dependency is corrected, such as by adding other components to the selected components to meet the dependency requirements of the software being installed. The process then proceeds to step 410 in which the component dependency is displayed to the user. The displayed list of component dependency further may identify any changes made to the user's selection data (step 412) to ensure proper dependency between components.

From step 410, the process proceeds to step 414 in which a determination is made as to whether the user accepts the displayed component dependency, including any changes made at step 412. This presents the user with an option to either accept the suggested list of components to be installed or to return to the component selection screen and select components manually. If the determination at step 414 is negative, the process returns to step 404 in which the user may manually enter or revise the component selections. If the determination at step 414 is positive, the process proceeds to step 416.

At step 416, an installation procedure is provided based on the component selection data, such as presented at step 410. The installation procedure defines a step-by-step process that a user may follow to install the components (and associated subcomponents). The installation procedure further sets forth an installation order for each of the components being installed. When the software is to be installed across more than one computer, the installation procedure also may indicate the order in which each component is to be installed at each computer identified at step 402. For example, the installation order may be determined from an installation order file that enumerates necessary installation orders associated with the various components.

From step 416, the process proceeds to step 418 in which component installation data is written to a file. The data defines characteristics of a data structure (see, e.g., FIG. 3) indicative of the components that are to be installed and the respective computers on which such components are to be installed. Next, at step 420, a determination is made as to whether a directory (or other appropriate data storage location) available to which the file may be written. The directory, for example, includes an extension of a directory service programmed to store the data structure in a predefined format. If the directory is available, the process proceeds to step 422, in which the file is written (or imported) to the directory. After the file has been written to the directory, the file may be deleted at step 424.

From step 424, the process proceeds to step 426 and the process ends. If the determination at step 420 is negative, indicating that the directory has not already been extended to store the data structure, the process also proceeds to step 426 to end the process.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for planning installation of a plurality of application and service components, comprising:
    an interface component for entering desired system configuration information that includes information that identifies selected components to be installed, the interface component provides an installation procedure based on dependency requirements for a plurality of application and service components. the dependency requirements include at least component installation order dependency;
    a file generation component programmed to generate a file that identifies a relationship between each of a plurality of computers and the selected components to be installet; and
    a dependency engine that, in response to a determination that improper dependency exists based on the selected components, automatically adds necessary components to correct dependency.

2. The system of claim 1, the installation procedure identifies an order for installing the selected components.

3. The system of claim 2, the system configuration information further includes information that identifies the plurality of computers across which the components are to be installed, the installation procedure further identifies an order for installing the selected components on each of the plurality of computers.

4. The system of claim 1, the interface component further comprises computer-executable instructions that write the file to a predetermined data location.

5. The system of claim 4, the predetermined data location comprises an object of a distributed directory.

6. The system of claim 5, the object further comprises a group object that characterizes a virtual group of computers, the group object includes at least one computer object that identifies member computers of the virtual group, the computer object includes at least one component object that characterizes the components selected to be installed on the member computers.

7. The system of claim 6, further including a setup engine operable to access the object and automate at least a portion of an associated installation process based on the information stored in the object.

8. The system of claim 1, further including a data packet transmitted between at least two processes that provides an installation procedure based on dependency requirements for a plurality of application and service components, the dependency requirements include at least component installation order dependency.

9. A method for planning installation of a plurality of application and service components, comprising:
    selecting a plurality of service components to be installed utilizing a user interface;
    determining an installation procedure based on dependency requirements for the selected components. the dependency requirements include at least component installation sequence dependency;
    generating a file that defines a relationship between each of a plurality of computers and the selected components to be instaled; and
    adding each component necessary to ensure proper dependency between the selected components automatically when improper dependency exists based on the components selected.

10. The method of claim 9, the installation procedure provides a sequence for installing the selected components.

11. The method of claim 10, further including identifying the plurality of computers across which the selected components are to be installed, the installation procedure provides a sequence for installing the selected components on each of the plurality of computers.

12. The method of claim 9, writing the file to a predetermined data location.

13. The method of claim 12, the predetennined data location comprises an object of a distributed directory.

14. The method of claim 13 the object further includes a group object for characterizing a virtual group of computers, the group object includes at least one computer object that identifies member computers of the virtual group, the computer object includes at least one component object that characterizes the components selected to be installed on the member computers.

15. The method of claim 14, further including employing the object to select at least one component for installation based on information stored in the object.

16. The method of claim 9, further including printing the installation procedure.

17. A computer-readable medium having computer-executable instructions for performing the method of claim 9.

18. A computer implemented system that facilitates installation of a plurality of application and service components, comprising:
    means for selecting a plurality of application and service components associated with a suite to be installed;
    means for identifying dependency requirements that include at least component installation order dependency for the plurality of application and service components;
    means for creatin a file that defines a relationship between each of a plurality of computers and the selected components to be instaled;
    means for generating an installation procedure for the selected components based on the dependency requirements; and
    means for automatically adding components to correct dependency of selected components.

* * * * *